United States Patent
Dasgupta et al.

(10) Patent No.: US 12,015,518 B2
(45) Date of Patent: Jun. 18, 2024

(54) NETWORK-BASED MINING APPROACH TO ROOT CAUSE IMPACTFUL TIMESERIES MOTIFS

(71) Applicant: Cisco Technology, Inc., San Jose, CA (US)

(72) Inventors: Sambarta Dasgupta, Sunnyvale, CA (US); Grégory Mermoud, Venthône (CH); Jean-Philippe Vasseur, Saint Martin d'Uriage (FR); Mukund Yelahanka Raghuprasad, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/979,341

(22) Filed: Nov. 2, 2022

(65) Prior Publication Data
US 2024/0146600 A1    May 2, 2024

(51) Int. Cl.
*H04L 41/0631* (2022.01)
*H04L 41/0677* (2022.01)
*H04L 43/08* (2022.01)

(52) U.S. Cl.
CPC ........ *H04L 41/064* (2013.01); *H04L 41/0677* (2013.01); *H04L 43/08* (2013.01)

(58) Field of Classification Search
CPC .... H04L 41/064; H04L 41/0677; H04L 43/08
USPC ...................................................... 709/224
See application file for complete search history.

(56) References Cited

U.S. PATENT DOCUMENTS

| | | | |
|---|---|---|---|
| 10,728,105 B2 | 7/2020 | Rossi et al. | |
| 11,106,989 B1* | 8/2021 | Waagen | G06F 16/2477 |
| 11,108,621 B1* | 8/2021 | Shirvani | G06F 18/22 |
| 11,163,722 B2* | 11/2021 | Wang | G06F 16/24568 |
| 11,244,224 B2* | 2/2022 | Bordawekar | G06N 20/00 |
| 11,388,042 B2 | 7/2022 | Vasseur et al. | |
| 11,397,427 B2* | 7/2022 | Burke | G05B 23/0283 |
| 11,461,683 B2* | 10/2022 | Thomas | G06V 10/772 |
| 11,522,766 B2* | 12/2022 | Boussac | G06N 20/00 |
| 11,567,756 B2* | 1/2023 | Nicolae | H04L 41/0631 |
| 11,574,145 B2* | 2/2023 | Narlikar | G06F 18/241 |
| 11,621,892 B2* | 4/2023 | Kim | H04L 43/045 709/223 |

(Continued)

OTHER PUBLICATIONS

Yeh, et al., "Matrix Profile I: All Pairs Similarity Joins for Time Series: A Unifying View That Includes Motifs, Discords and Shapelets", 2016 IEEE 16th International Conference on Data Mining (ICDM), Dec. 2016, pp. 1317-1322, IEEE, Barcelona, Spain.

(Continued)

*Primary Examiner* — Melvin H Pollack
(74) *Attorney, Agent, or Firm* — BEHMKE INNOVATION GROUP LLC; James M. Behmke; James J. Wong

(57) ABSTRACT

In one embodiment, a device identifies a timeseries motif present in a plurality of timeseries of performance metrics for a plurality of paths in a network. The device retrieves, based on the timeseries motif, device-level telemetry data from networking devices along the plurality of paths. The device determines a root cause of the timeseries motif by correlating the timeseries motif with the device-level telemetry data. The device provides an indication of the timeseries motif and its root cause for display by a user interface.

20 Claims, 13 Drawing Sheets

(56) References Cited

U.S. PATENT DOCUMENTS

| | | | |
|---|---|---|---|
| 11,671,312 B2* | 6/2023 | Puri | H04L 43/04 |
| | | | 709/224 |
| 11,683,234 B2* | 6/2023 | Rapoport | G06F 11/3452 |
| | | | 709/224 |
| 11,683,421 B2* | 6/2023 | Junkins | H04M 15/00 |
| | | | 370/329 |
| 11,693,721 B2* | 7/2023 | Wouhaybi | G06F 11/3447 |
| | | | 714/47.3 |
| 11,706,115 B2* | 7/2023 | Chandrasekaran | H04L 47/28 |
| | | | 709/224 |
| 11,720,591 B1* | 8/2023 | Zhao | G06F 16/248 |
| | | | 707/722 |
| 11,762,752 B2* | 9/2023 | de Abreu Pinho | G06F 18/24 |
| | | | 709/224 |
| 11,765,056 B2* | 9/2023 | Morman | H04L 43/0876 |
| | | | 709/202 |
| 2011/0246483 A1 | 10/2011 | Darr et al. | |
| 2017/0249564 A1* | 8/2017 | Garvey | G06T 11/001 |
| 2018/0052804 A1* | 2/2018 | Mikami | G06Q 10/04 |
| 2019/0318288 A1 | 10/2019 | Noskov et al. | |
| 2019/0356553 A1 | 11/2019 | Mermoud et al. | |
| 2019/0379589 A1 | 12/2019 | Ryan et al. | |
| 2020/0382361 A1 | 12/2020 | Chandrasekhar et al. | |
| 2020/0389387 A1* | 12/2020 | Magzimof | H04L 45/24 |
| 2021/0231535 A1* | 7/2021 | Nakamura | G06F 16/2365 |
| 2021/0365611 A1* | 11/2021 | Agrawal | G06N 20/00 |
| 2021/0377098 A1 | 12/2021 | Shirvani et al. | |
| 2021/0390423 A1 | 12/2021 | Latapie et al. | |
| 2022/0231903 A1 | 7/2022 | Thampy et al. | |
| 2022/0245440 A1* | 8/2022 | Subramanian | G06F 9/3836 |
| 2022/0329522 A1* | 10/2022 | Maciocco | H04L 41/16 |
| 2022/0398466 A1* | 12/2022 | Wu | G06N 3/0442 |
| 2022/0414472 A1* | 12/2022 | Maezawa | G06N 3/08 |
| 2023/0016946 A1* | 1/2023 | Wouhaybi | G06F 16/901 |
| 2023/0033680 A1* | 2/2023 | Whatley | G06F 18/2134 |
| 2023/0081673 A1* | 3/2023 | Junkins | H04W 28/0268 |
| | | | 370/235 |
| 2023/0136071 A1* | 5/2023 | Evans | G06F 18/24323 |
| | | | 706/20 |
| 2023/0198877 A1* | 6/2023 | Dickgiesser | G06F 11/3006 |
| | | | 709/224 |
| 2023/0269145 A1* | 8/2023 | Fauber | H04L 69/04 |
| | | | 709/224 |
| 2023/0283514 A1* | 9/2023 | Jea | H04L 41/0627 |
| | | | 709/224 |

OTHER PUBLICATIONS

Kleinberg, Jon, "Bursty and Hierarchical Structure in Streams", KDD '02: Proceedings of the eighth ACM SIGKDD international conference on Knowledge discovery and data mining, Jul. 2002, 25 pages, ACM.

Paparrizos, et al., "k-Shape: Efficient and Accurate Clustering of Time Series", SIGMOD Record, vol. 45, Issue 1, Mar. 2016, pp. 67-76, ACM.

* cited by examiner

| snippet | $S_1$ | ... | $S_i$ | ... | $S_j$ | ... | $S_N$ |
|---|---|---|---|---|---|---|---|
| $S_1$ | $d(S_1,S_2)$ | ... | $d(S_1,S_i)$ | ... | $d(S_1,S_j)$ | ... | $d(S_1,S_N)$ |
| ... | ... | ... | ... | ... | ... | ... | ... |
| $S_i$ | $d(S_i,S_1)$ | ... | $d(S_i,S_i)$ | ... | $d(S_i,S_j)$ | ... | $d(S_i,S_N)$ |
| ... | ... | ... | ... | ... | ... | ... | ... |
| $S_j$ | $d(S_j,S_1)$ | ... | $d(S_j,S_i)$ | ... | $d(S_j,S_j)$ | ... | $d(S_j,S_N)$ |
| ... | ... | ... | ... | ... | ... | ... | ... |
| $S_N$ | $d(S_N,S_1)$ | ... | $d(S_N,S_i)$ | ... | $d(S_N,S_j)$ | ... | $d(S_N,S_N)$ |

FIG. 7A

| | $t_1$ | $t_2$ | ... | $t_T$ |
|---|---|---|---|---|
| $S_1$ | $x_{11}$ | $x_{12}$ | ... | $x_{1T}$ |
| $S_2$ | $x_{21}$ | $x_{22}$ | ... | $x_{2T}$ |
| $S_3$ | $x_{31}$ | $x_{32}$ | ... | $x_{3T}$ |
| ... | ... | ... | ... | ... |
| $S_i$ | $x_{i1}$ | $x_{i2}$ | ... | $x_{iT}$ |
| ... | ... | ... | ... | ... |
| $S_N$ | $x_{N1}$ | $x_{N2}$ | ... | $x_{NT}$ |

NETWORK-BASED MINING APPROACH TO ROOT CAUSE IMPACTFUL TIMESERIES MOTIFS

TECHNICAL FIELD

The present disclosure relates generally to computer networks, and, more particularly, to a network-based mining approach to root cause impactful timeseries motifs.

BACKGROUND

With the recent evolution of machine learning, predictive failure detection and proactive routing in a network now becomes possible through the use of machine learning techniques. For instance, modeling the delay, jitter, packet loss, etc. for a network path can be used to predict when that path will violate the service level agreement (SLA) of the application and reroute the traffic, in advance. However, doing so is also not without cost, as needlessly rerouting application traffic can also negatively impact the application experience of a user.

Traditionally, SLA thresholds have been used as a proxy for the true quality of experience (QoE) of an online application from the perspective of the end user. In other words, it is assumed that if the SLA is being violated, the QoE of the application is also degraded. While this may hold true in clear situation of network impairment, some of the more complex types of impairments could go unnoticed by network systems because of the specificity of the impairment definition or because of other factors that limit visibility to such impairments. Moreover, such threshold-based mechanisms rely on long-standing phenomena captured by computing aggregate statistics on the network path metrics (e.g. the average delay, etc.), which is far from being able to capture all network issues that affect application QoE in real-life.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 7A-7B illustrate examples of distance based clustering;

DESCRIPTION OF EXAMPLE EMBODIMENTS

Overview

Figure 1A:
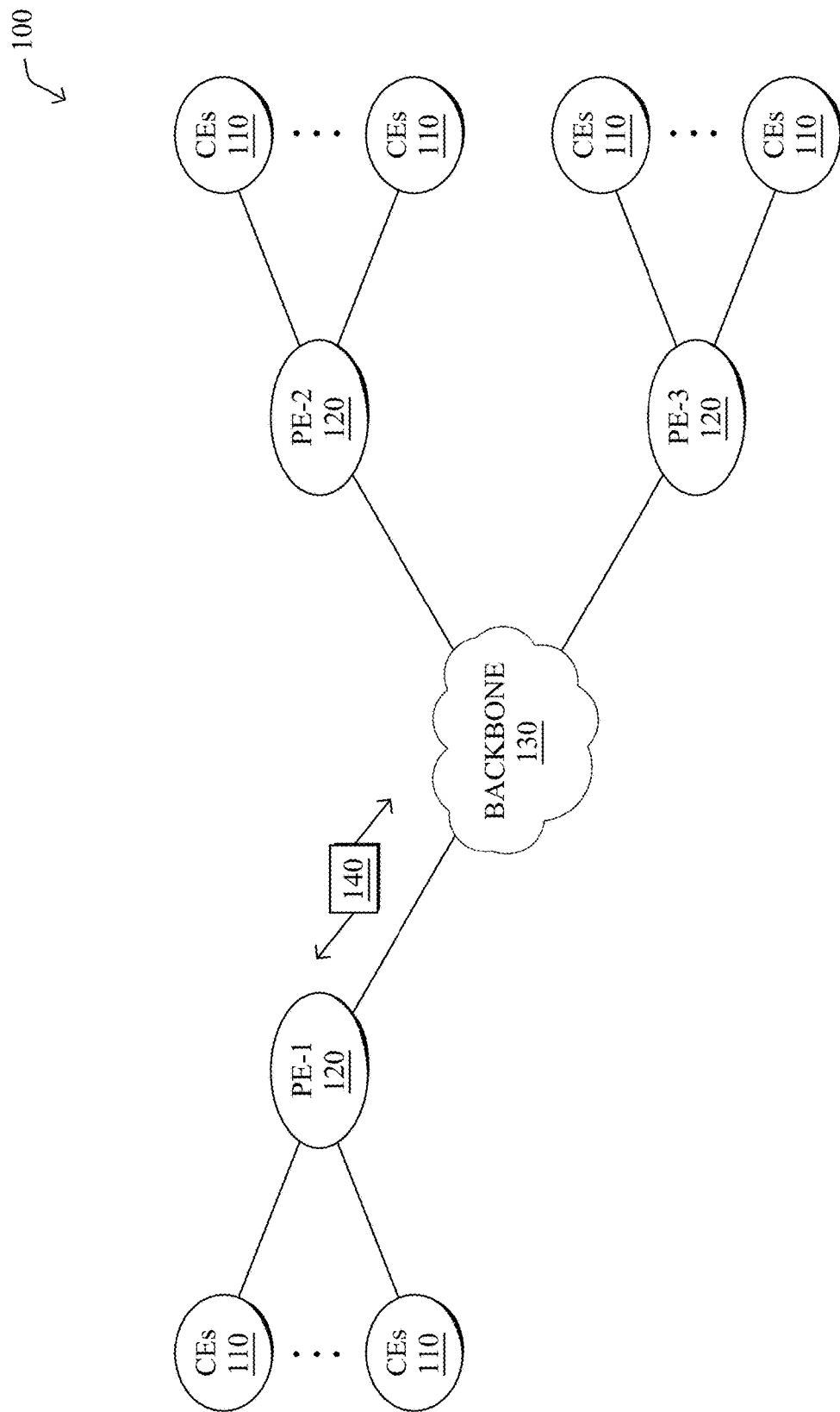
FIGS. 1A-1B illustrate an example communication network.

According to one or more embodiments of the disclosure, a device identifies a timeseries motif present in a plurality of timeseries of performance metrics for a plurality of paths in a network. The device retrieves, based on the timeseries motif, device-level telemetry data from networking devices along the plurality of paths. The device determines a root cause of the timeseries motif by correlating the timeseries motif with the device-level telemetry data. The device provides an indication of the timeseries motif and its root cause for display by a user interface.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
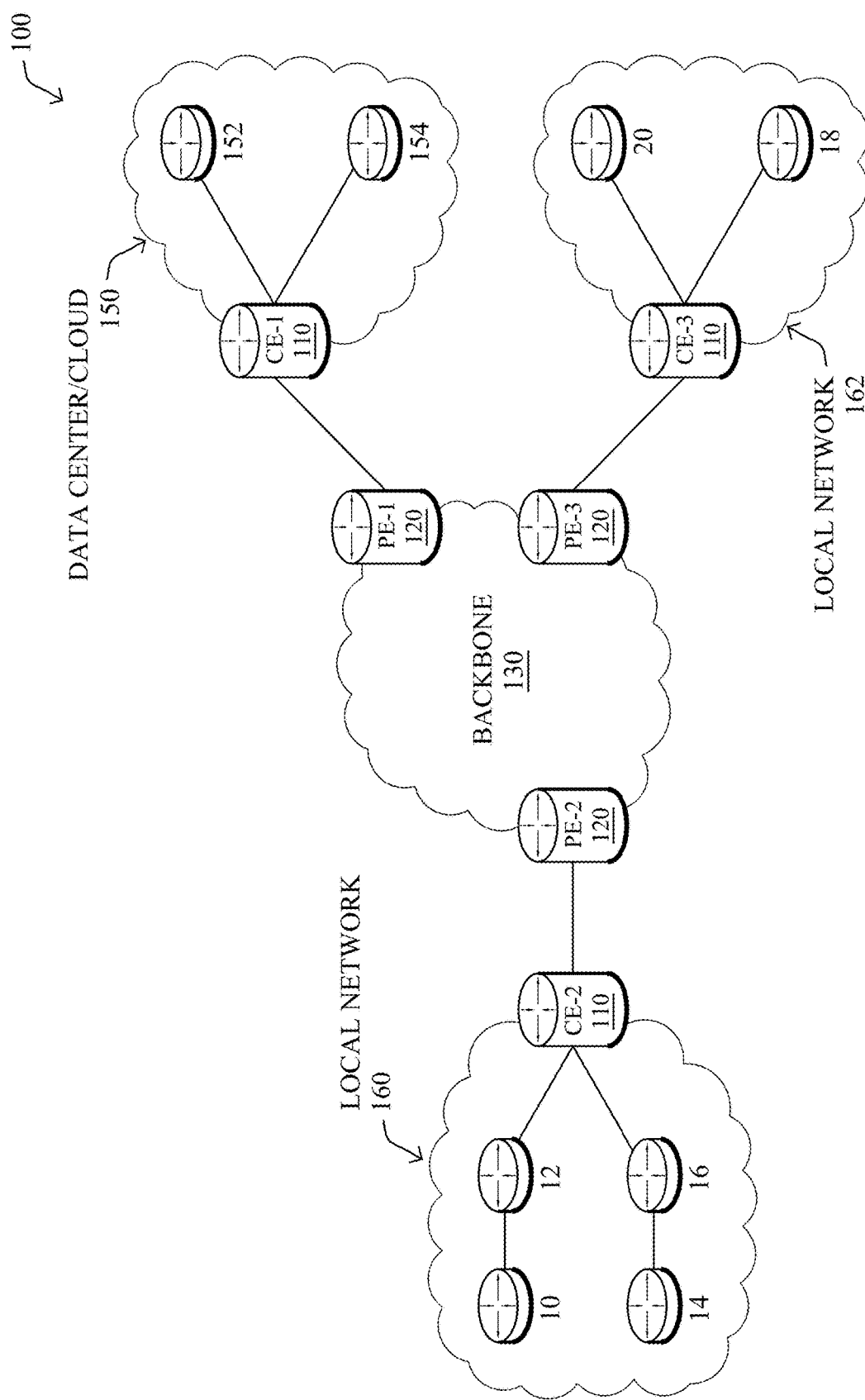

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
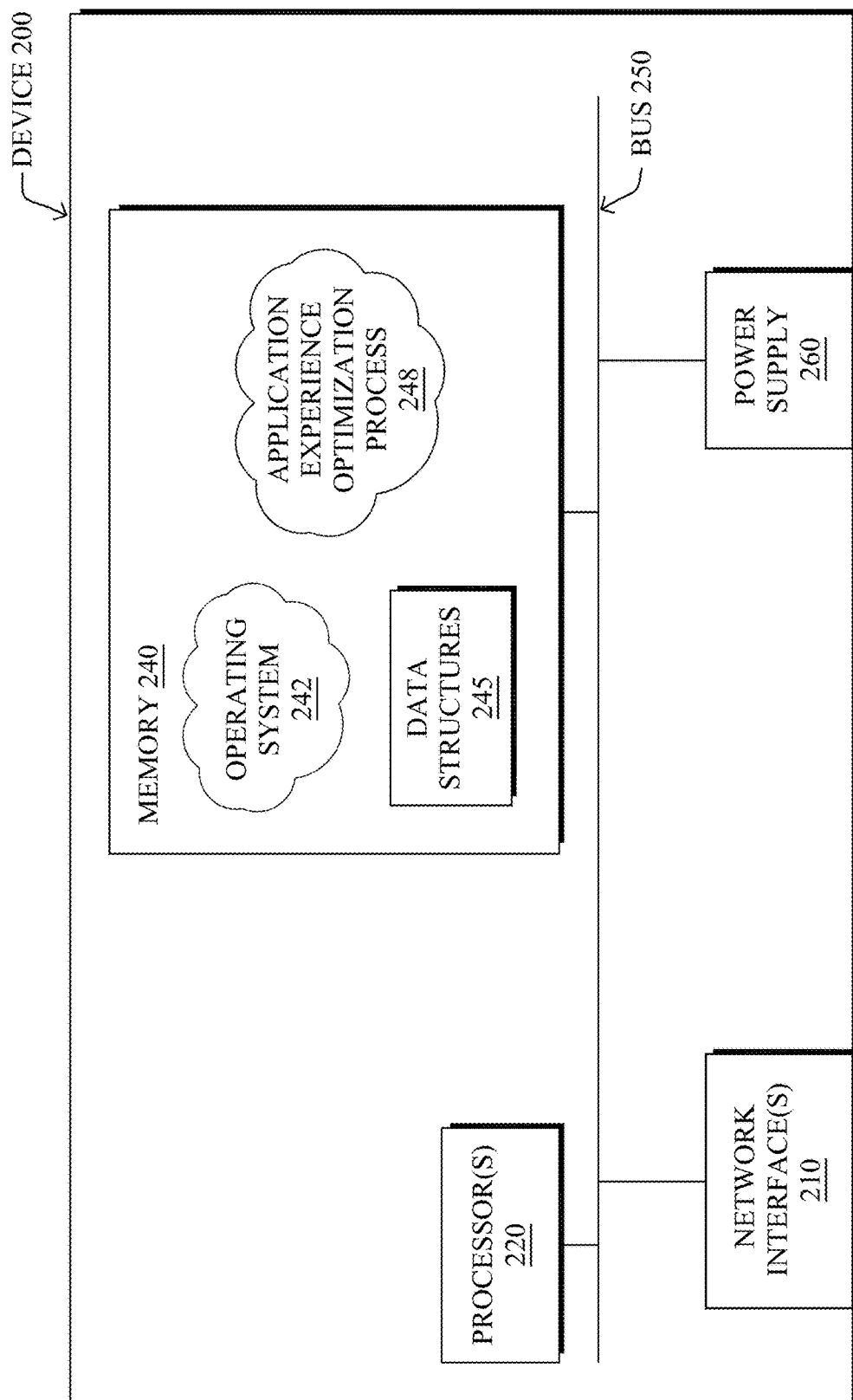
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application experience optimization process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 and/or data denoising process may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
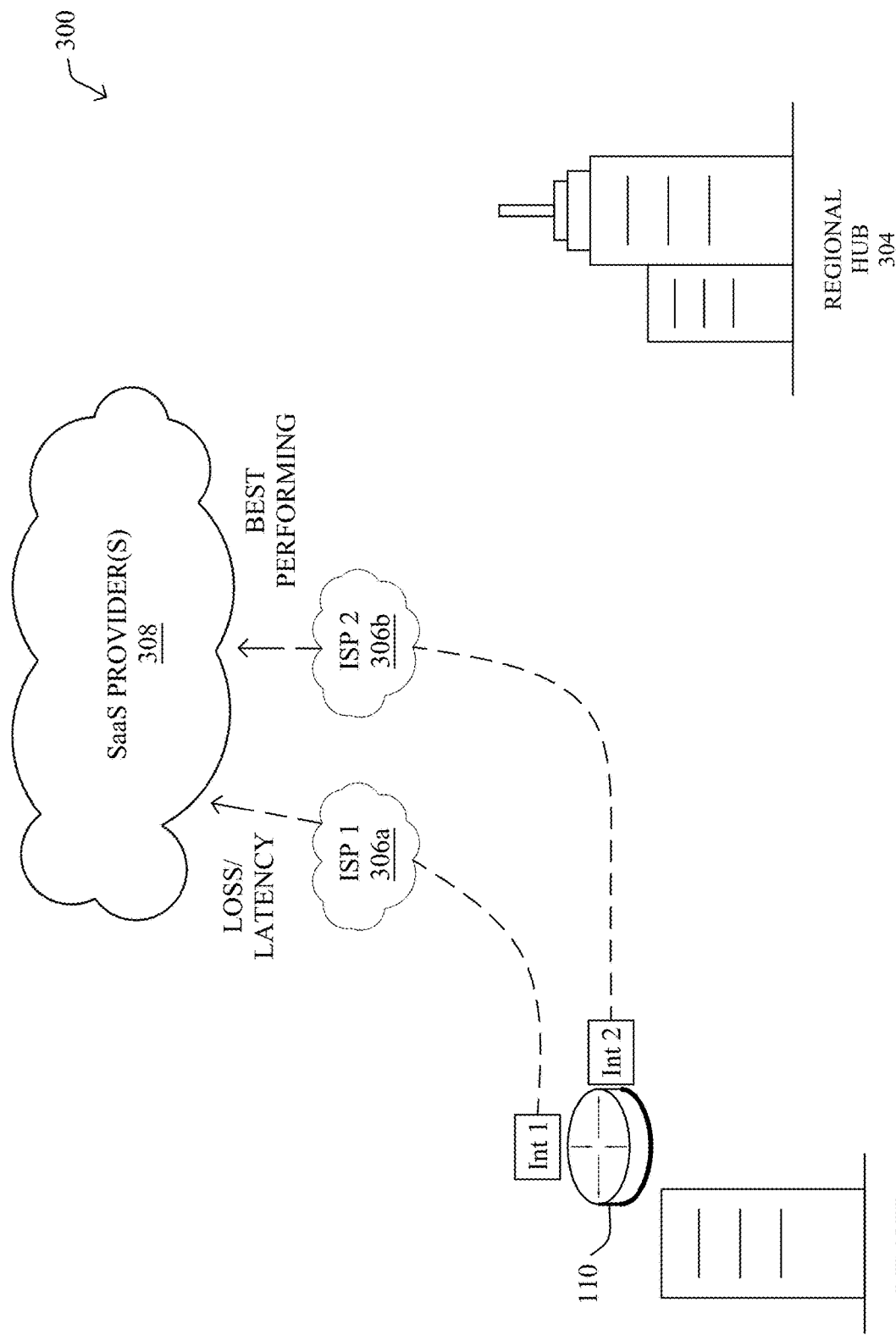
FIGS. 3A-3B illustrate example network deployments.
Figure 3B:
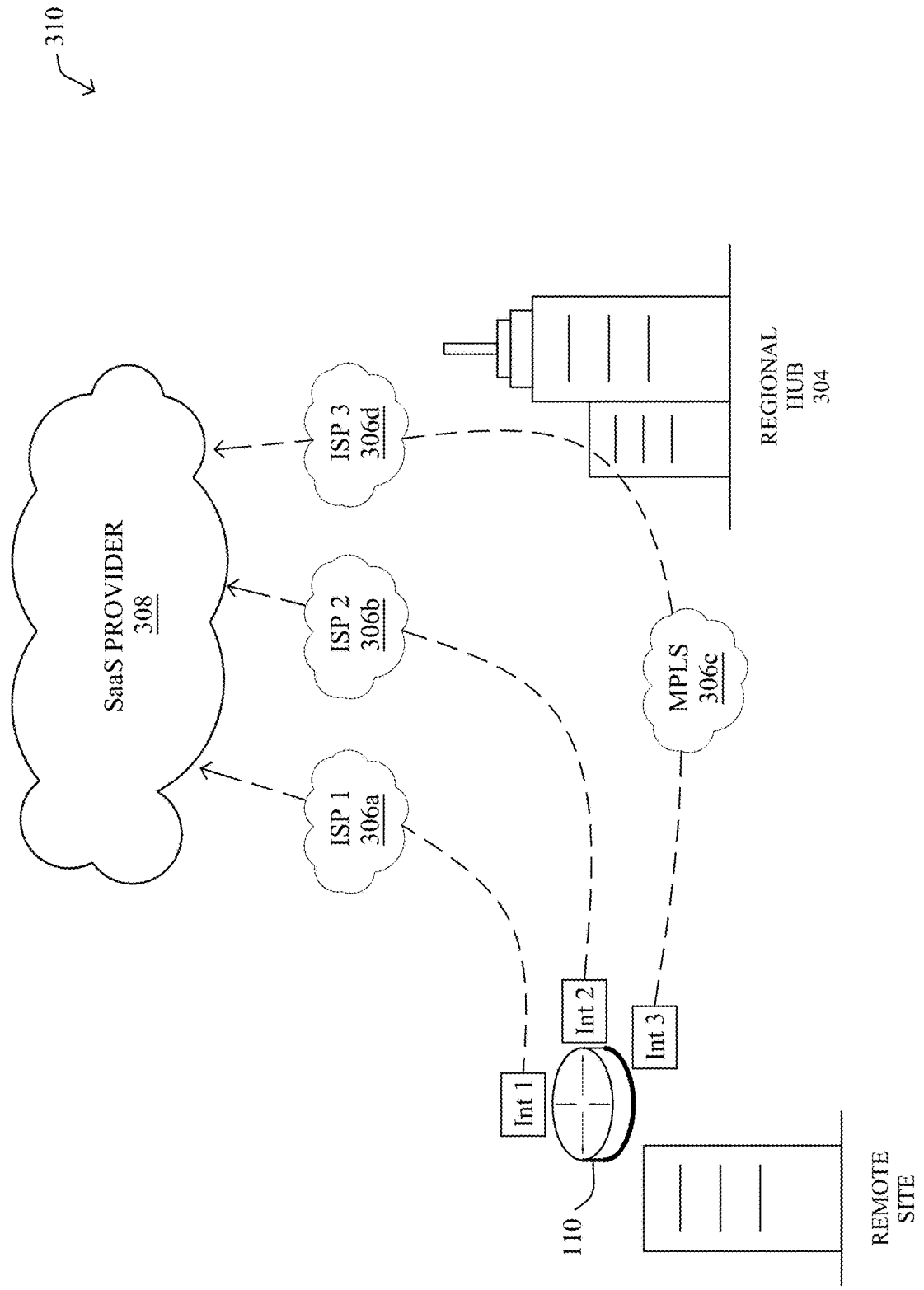

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
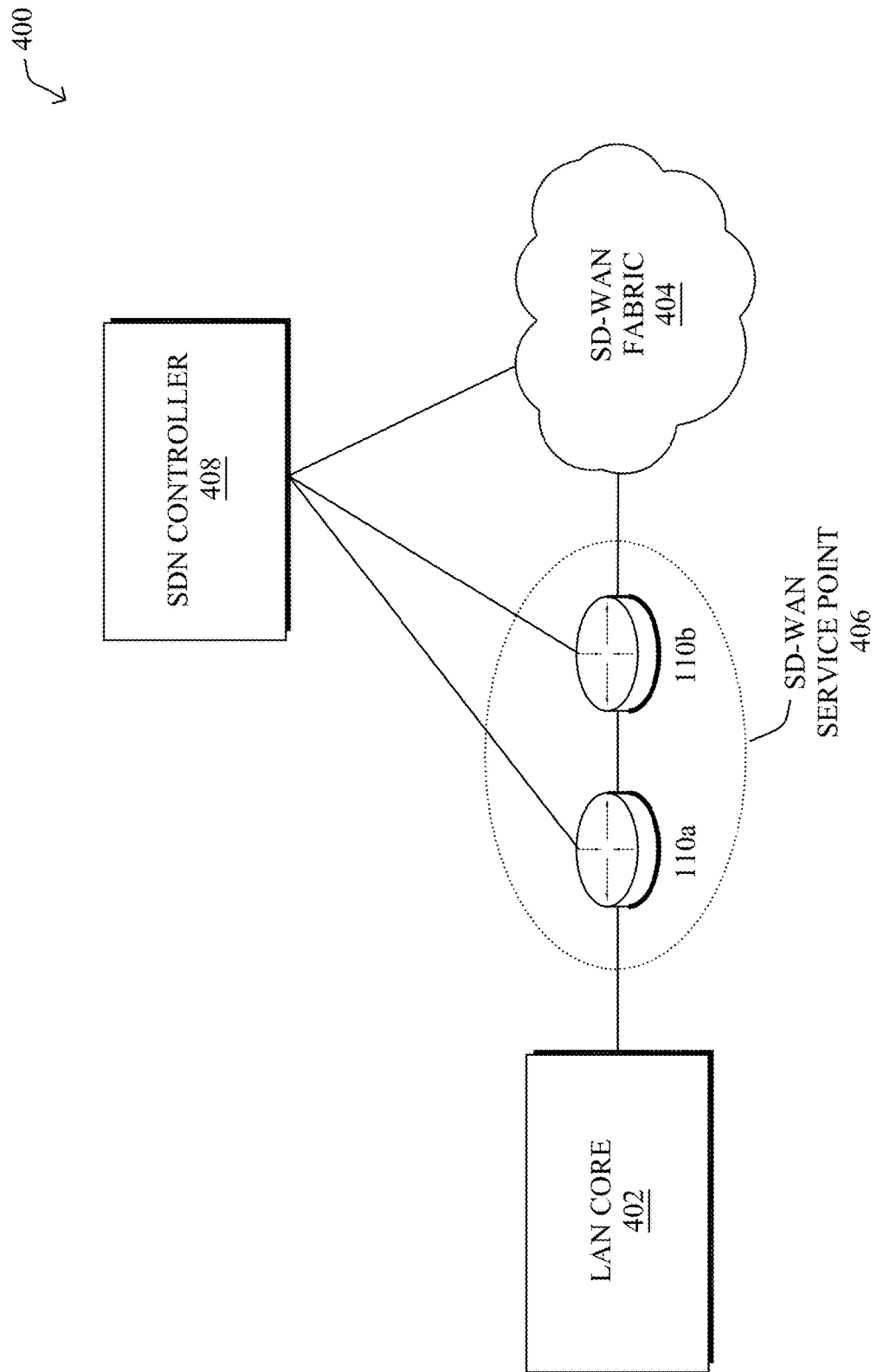
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing. CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

- The SLA for the application is 'guessed,' using static thresholds.
- Routing is still entirely reactive: decisions are made using probes that reflect the status of a path at a given time, in contrast with the notion of an informed decision.
- SLA failures are very common in the Internet and a good proportion of them could be avoided (e.g., using an alternate path), if predicted in advance.

Figure 4B:
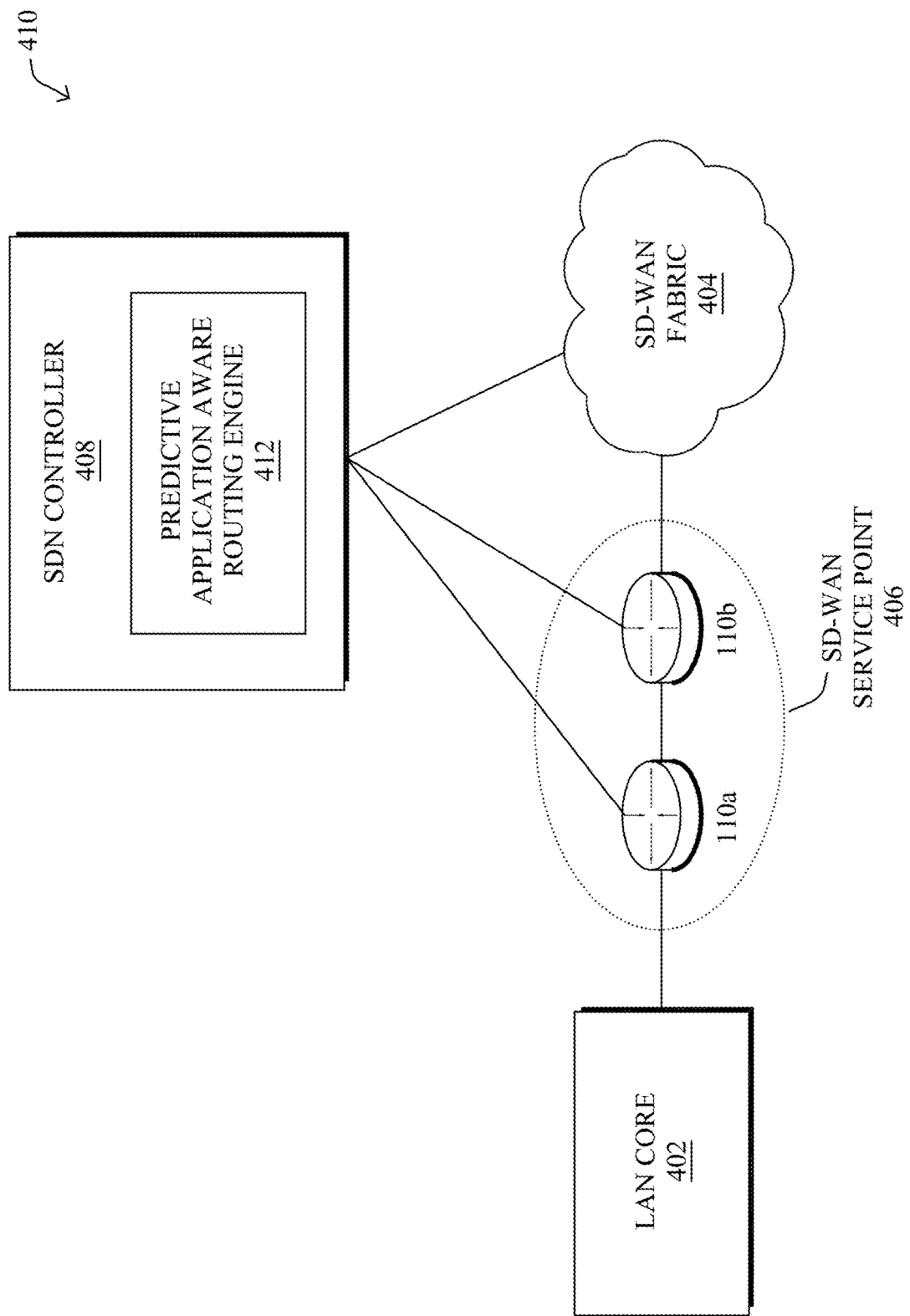

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, application Quality of Experience (QoE) may be degraded because of a wide variety of different types and patterns of network impairments. One observation herein is that such impairments, while complex and dynamic, are also typically repetitive in nature. Current network systems, however, do not consider such complexity when identifying QoE degradation. In terms of identifying "unfavorable" network behavior, predictive application aware routing engine 412 may, in some embodiments, rely on SLA thresholds or a more advanced concept such as application failures which depend on specific threshold for a specific set of path metrics/key performance indicators (KPIs), to infer the QoE of an application. While this may hold true in clear situation of network impairment, some of the more complex types of impairments could go unnoticed by network systems because of the specificity of the impairment definition or because of other factors that limit visibility to such impairments. Moreover, some existing threshold-based mechanisms rely on long-standing phenomena captured by computing aggregate statistics on the network path metrics (e.g. the average delay, etc.), which is far from being able to capture all network issues that affect application QoE in real-life One example of a factor limiting visibility to the routing system would be the granularity of the network telemetry itself. Consider a network path that undergoes bursts of packet loss whereby each burst drops 25% of the packets and the burst lasts for two seconds and occurs at regular intervals of eight seconds. If the network system measures the packet loss for the path at a granularity of every minute, the average packet loss for that minute will lead to an average packet loss of 5%. While problematic, a packet loss of 5% may also not meet the definition of an application failure (e.g., a condition in which the QoE is considered unacceptable), such as for a video conferencing application. Indeed, many video codecs are now resilient to packet loss and the system may assume that a packet loss of only 5% is not actually degrading the QoE of the application. However, from the perspective of the users, the bursts of packet loss of 25% may very well impact their experience with the application.

Accordingly, any application experience optimization mechanism for a network should be able to identify any prevalent network impairments/patters, referred to herein as "motifs," and associate them with their respective effects on the QoE of an application. Such visibility can aid predictive application aware routing engine 412 in predicting or tagging application failures at runtime. In addition, identifying such (repetitive) KPI patterns is a must when analyzing application QoE, and can be of the utmost importance for specific link type in the Internet. For instance, when analyzing the latency telemetry for a (LEO) satellite-based communication network, the motifs observed can be attributed to the satellite-switching observed in such a network. Thus, extracting the motifs can be very important so that proactive and/or reactive measures can be taken to optimize the QoE of the online application. Such extracted information can be combined with root causing using network-related events in support of various mechanisms, such as predictions, anomaly detection, and the like.

Network-Based Mining Approach to Root Cause Impactful Timeseries Motifs

The techniques herein introduce several components whereby: 1.) motifs are selected from a database of motifs that characterize network/path patterns along with meta information such as per-application QoE corresponding to the motif, 2.) on-demand networking and non-networking telemetry is gathered from a plurality of devices that are corresponding to the motif of interest in order to assign network subject matter expert (SME) tags to the said motifs, and/or 3.) motif root causing is expanded to multiple routers/switches in order to root cause phenomenon that are non-local. Furthermore, the techniques herein can not only be used for network troubleshooting to better understand which event causes a motif of interest (e.g., leading to QoE degradation), but also for training models to predict/forecast labeled data (forecast an event having a specific tag). In some aspects, various mechanisms are also introduced for gathering the telemetry of interest (retrieving existing telemetry, activating telemetry collection upon detecting a specific motif, etc.) both for networking and non-networking information.

Illustratively, the techniques described herein may be performed by hardware, software, and/or firmware, such as in application experience optimization process 248, which may include computer executable instructions executed by the processor 220 (or independent processor of interfaces 210) to perform functions relating to the techniques described herein.

Specifically, according to various embodiments, a device identifies a timeseries motif present in a plurality of timeseries of performance metrics for a plurality of paths in a network. The device retrieves, based on the timeseries motif, device-level telemetry data from networking devices along the plurality of paths. The device determines a root cause of the timeseries motif by correlating the timeseries motif with the device-level telemetry data. The device provides an indication of the timeseries motif and its root cause for display by a user interface.

Figure 5:
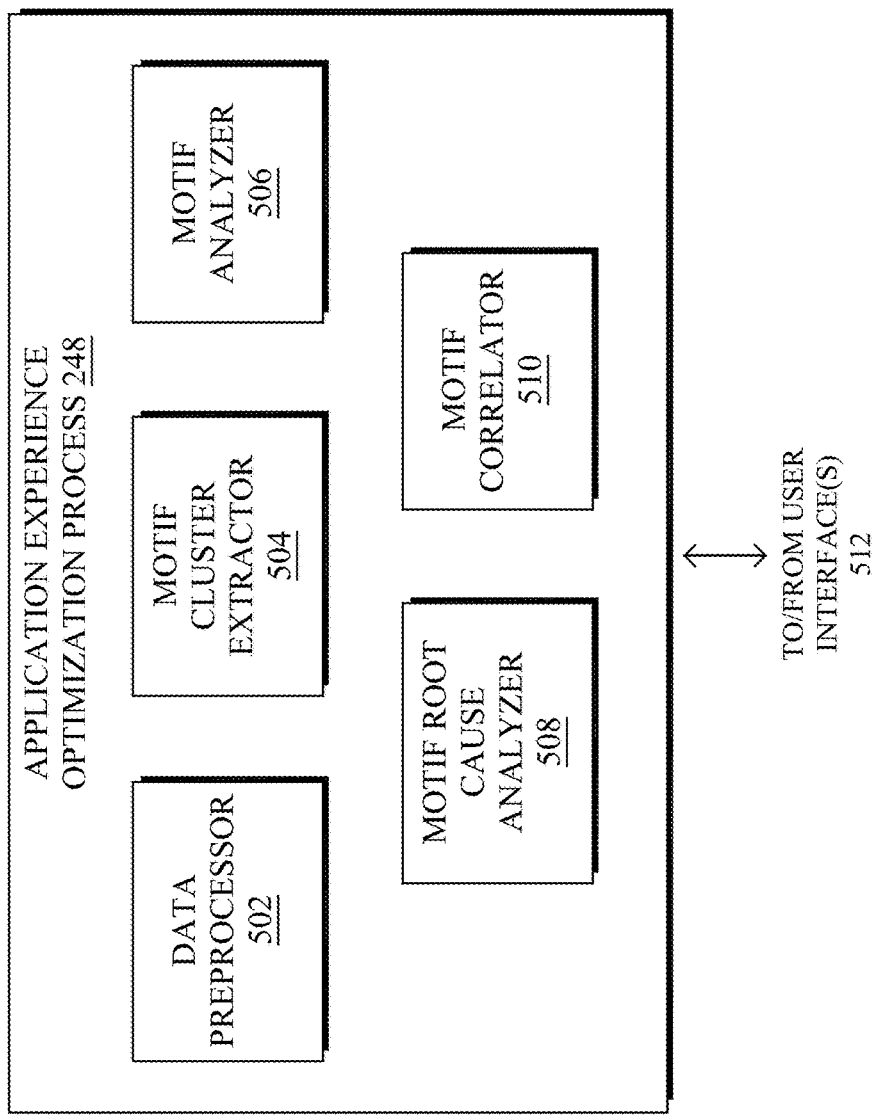
FIG. 5 illustrates an example architecture for root causing timeseries motifs.

Operationally, FIG. 5 illustrates an example architecture for root causing timeseries motifs, according to various embodiments. At the core of architecture 500 is application experience optimization process 248, which may be executed by a controller for a network, a networking device, or another device in communication therewith. For instance, application experience optimization process 248 may be executed by a controller for a network (e.g., SDN controller 408 in FIGS. 4A-4B), a particular networking device in the network (e.g., a router, etc.), another device or service in communication therewith, or the like. In some embodiments, for instance, application experience optimization process 248 may be used to implement a predictive application aware routing engine, such as predictive application aware routing engine 412, or another supervisory service for the network. In other embodiments, application experience optimization process 248 may be used to implement a reactive routing approach in the network.

As shown, application experience optimization process 248 may include any or all of the following components: a data preprocessor 502, a motif cluster extractor 504, a motif analyzer 506, a motif root cause analyzer 508, and/or a motif correlator 510. As would be appreciated, the functionalities of these components may be combined or omitted, as desired (e.g., implemented as part of application experience optimization process 248). In addition, these components may be implemented on a singular device or in a distributed manner, in which case the combination of executing devices can be viewed as their own singular device for purposes of executing application experience optimization process 248.

As would be appreciated, application experience optimization process 248 may operate in conjunction with any number of telemetry collection mechanisms, to collect performance metrics regarding the various network paths (e.g., DIA paths, tunnels, etc.), the online applications themselves, or the like. For instance, path metrics may be obtained by sending probes along the various paths/tunnels, such as Bidirectional Forwarding Detection (BFD) or CXP probes, that indicate path metrics such as loss, latency, jitter, throughput, etc. Netflow or IPFIX records represent another potential source of the telemetry data. In some embodiments, application experience optimization process 248 may also obtain telemetry data from the online application(s) under consideration, such as via an application programming interface (API). For instance, application experience optimization process 248 may obtain application feedback as a continuous number or a discrete value (e.g., 'good' 'bad,' 'no opinion,' etc.), or multiple such metrics.

In various embodiments, data preprocessor 502 may take as input the network-level and application-level metrics and processes them for further analysis, as detailed below. To this end, data preprocessor 502 may perform any or all of the following:
  Depending on the amount of noise/entropy in the data, process the telemetry to denoise or scale the values of the metrics
  Modify the timeseries of all the metrics, to arrive at the required timeseries snippets (e.g., portions of the timeseries extracted using a sliding time window).
  If required, filter out the snippets such that only those time-snippets with some form of QoE degradation experience are examined for motifs.

With respect to its denoising operations, data preprocessor 502 may interact with one or more user interfaces 510, allowing the user(s) to specify the parameters and/or denoising technique to use, such as based on the time granularity of the timeseries, the noise distribution of the metrics, etc. In other instances, data preprocessor 502 may use default parameters and a preselected denoising technique. Regardless, if data preprocessor 502 deems a particular timeseries noisy beyond a certain threshold, it may apply denoising to the timeseries.

By way of example, data preprocessor 502 may process a high frequency timeseries of latency metrics measured along a network path. If it finds that the timeseries is noisy and contains relatively smaller fluctuations which could affect the extraction of motifs, then it may initiate denoising. To do so, data preprocessor 502 may clip the timeseries below a certain quantile threshold (e.g., the 25% quantile or other suitable threshold), for instance. In this case, the timeseries may be clipped at such a lower threshold, as doing so preserves the spikes seen at higher ranges of latency which could possibly cause QoE degradations. Depending on the region of interest (higher or lower values) or the nature of the telemetry metric, the appropriate quantile level can be selected either automatically or based on a manually set parameter. In other embodiments, data preprocessor 502 could smooth the timeseries by aggregating over a rolling-window, employing a Fast Fourier Transform (FFT)-based technique where frequencies with lower signal power are removed, or the like.

Figure 6A:
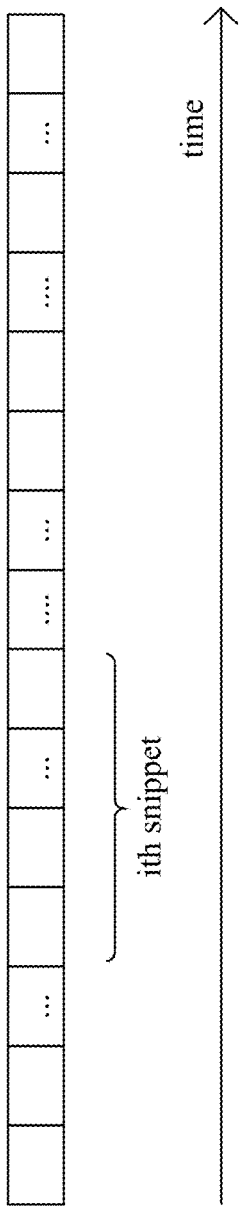
FIGS. 6A-6B illustrate examples of the extraction of snippets from a timeseries.
Figure 6B:
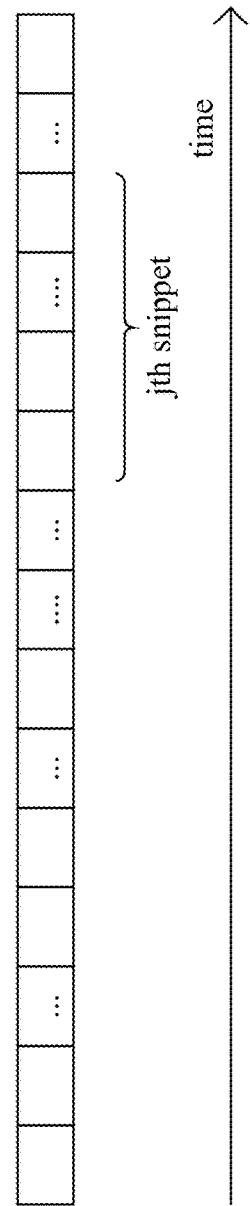

To generate the snippets for a given timeseries, data preprocessor 502 may apply a sliding time window to it. For instance, FIGS. 6A-6B illustrate examples of the extraction of snippets from a timeseries. More specifically, example 600 in FIG. 6A shows the extraction of the $i^{th}$ snippet from a timeseries. Similarly, example 610 in FIG. 6B shows the extraction of the $j^{th}$ snippet from that timeseries. This process may be repeated any number of times, so as to generate a set of snippets to be analyzed.

It is to be noted that each snippet for each metric preferably has a fixed length. For instance, assuming a 500 ms sampling period for the metric, a 1 minute span may have 120 lengths of snippet. In other embodiments, data preprocessor 502 may subject the snippets to a dimensionality reduction technique, such as Principal Component Analysis (PCA), t-Stochastic Neighborhood Estimation (t-SNE), etc., to project the snippets onto to smaller dimensions without losing variability. Such dimensionality reduction can also aid in the better extraction of motifs.

In various embodiments, motif cluster extractor 504 may analyze the timeseries snippets, to identify any motifs present therein. To do so, in some embodiments, motif cluster extractor 504 may perform clustering on the snippets, to generate clusters which possess the same shape. For multivariate cases, the clusters can either be generated in a way that the snippets for only a subset of the different metrics match or the snippets for all of the different metrics match. Furthermore, motif cluster extractor 504 may also prune the clusters so as to ensure that the snippets within a cluster, which share a time-window are considered only once, thereby preventing redundant motifs from being generated.

In some embodiments, motif cluster extractor 504 may also enforce the "shape" or "characteristic" of a motif, as specified by a user via a user interface 512. Some of the characteristics enforced could be duration, duration, observed magnitude of change of the metric, increases in first/second derivative, number of times the motif appears per time-interval, number of times the motif appears in the network (number of nodes), or the like.

In one embodiment, motif cluster extractor 504 may extract motifs by applying distance-based clustering to the timeseries snippets. To do so, motif cluster extractor 504 may create a square matrix with the distance between each snippet. The distance metric can be the L1 norm, L2 norm, Dynamic Time Warping (DTW) distance, or any other distance metric that can be used to measure the similarity of two timeseries snippets. Said differently, the distance is a metric measuring the degree of similarity between two snippets.

For instance, let a first snippet be defined as $s_i[x_i, x_{i+1}, \ldots, x_{i+T}]$ and a second snippet be defined as $s_j=[x_j, x_{j+1}, \ldots, x_{j+T}]$. In such a case, the normalized Euclidean distance (L2) is defined as:

$$d_{L2}(s_i, s_j) = \frac{\sqrt{\sum_{k=0}^{T}(x_{i+k} - x_{j+k})^2}}{\sqrt{\sum_{k=0}^{T} x_{i+k}^2} \cdot \sqrt{\sum_{k=0}^{T} x_{j+k}^2}}$$

Similarly, the normalized L1 distance is defined as:

$$d_{L1}(s_i, s_j) = \frac{\sum_{k=0}^{T} |x_{i+k} - x_{j+k}|}{\left(\sum_{k=0}^{T} |x_{i+k}|\right) \cdot \left(\sum_{k=0}^{T} |x_{j+k}|\right)}$$

The mixed L1/L2 distance is defined as:

$$d(s_i, s_j) = \frac{d_{L1}(s_i, s_j) + d_{L2}(s_i, s_j) + dtw(s_i, s_j)}{3}$$

FIG. 7A illustrates an example distance matrix 700 in which the mixed L1/L2 distances between N-number of snippets are stored. In turn, motif cluster extractor 504 may cluster distance matrix 700 into groups using a clustering approach such as Hierarchical Clustering, Spectral Clustering, Density-Based Spatial Clustering of Applications with Noise (DBSCAN), or any other suitable clustering approach. Although, this approach can be a viable solution the computational complexity and storage complexity will be $O(n^2)$, where n is the number of snippets.

In another embodiment, motif cluster extractor 504 may perform a Direct Iterative Clustering of Snippets. In this alternative approach, the snippet matrix may take the form of matrix 710 in FIG. 7B. Here, snippet matrix 710 can be further clustered using any suitable clustering approach. The main advantage of using this approach would be to avoid the expensive task of computing a distance matrix. One potential algorithm suitable for the formation of snippet matrix 710 is the KShape algorithm, which uses an iterative approach to clustering, similar to KMeans. Doing so reduces the computational complexity to $O(kn)$, and the storage complexity $O(dn)$, where k is the number of clusters, d is the length of a snippet, and n is the number of snippets.

Once motif cluster extractor 504 has performed its clustering, it may also prune the snippets to ensure that there are no redundant motifs, in some embodiments.

Figure 8A:
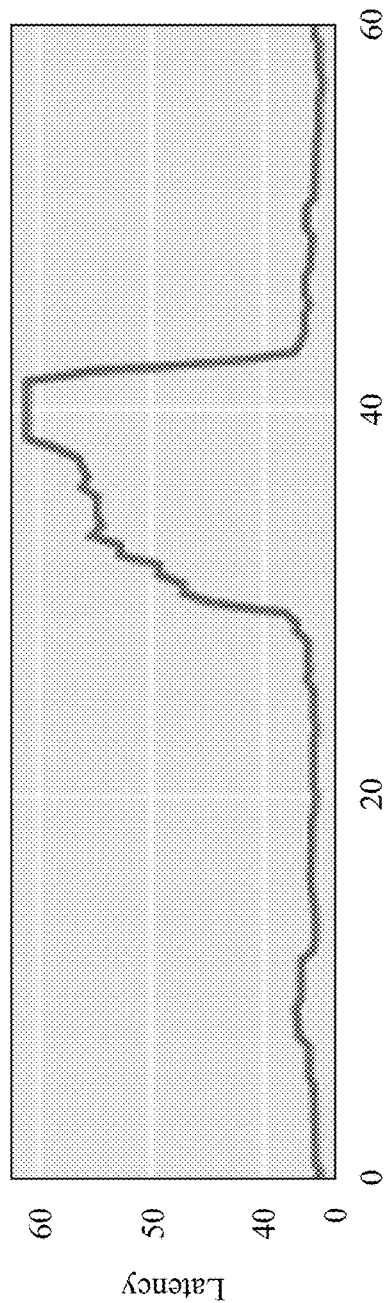
FIGS. 8A-8B illustrate example motifs extracted from timeseries.
Figure 8B:
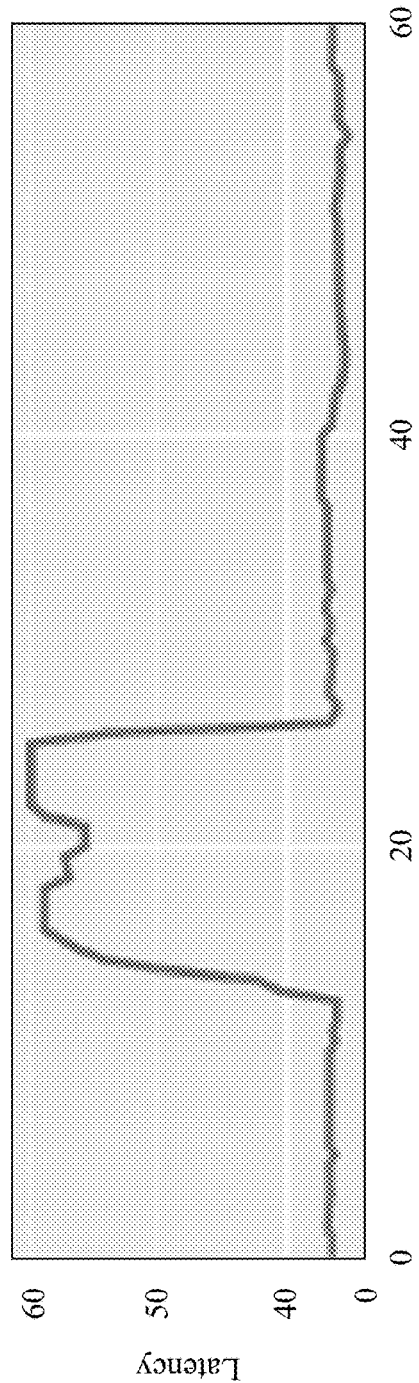

By way of example, FIGS. 8A-8B illustrate example motifs extracted from timeseries, in various embodiments. As shown, each motif may be assigned an identifier that corresponds to its cluster of snippets (e.g., "cluster=x"). For instance, FIG. 8A shows motif 800 extracted from a timeseries of latency/delay metrics. Similarly, FIG. 8B shows motif 810 also extracted from the timeseries. As can be seen, both motifs exhibit very different behaviors. Indeed, it can be observed that different clusters have different motifs of different shapes or structures.

Testing has also revealed that many motifs are recurring, although some are not recurrent at consistent time intervals. Also, if motif cluster extractor 504 perform cluster pruning, the occurrence of the detection of motifs may always be separated from one another by a certain threshold. The pruning stage also enforces the shape of the motif. Accordingly, motif cluster extractor 504 may have the ability to extract clusters with a minimum number of timeseries peaks observed and a minimum number of change-points observed in the delay timeseries.

For simplicity, the clustering shown in FIGS. 8A-8B are for the univariate case (e.g., for a single metric). However, in further embodiments, the techniques herein can be extended as well for the multivariate case (e.g., with timeseries for more than one type of metric) by either performing dimensionality reduction (e.g., as performed by data preprocessor 502) or by performing an additional clustering on top of the initial clustering performed individually for each of the different metrics, treated as a univariate case.

Referring again to FIG. 5, in various embodiments, motif analyzer 506 may assess any or all of the timeseries motifs identified by motif cluster extractor 504 and determine the set of motifs for which network-related root causing is required. In simple embodiments, motif analyzer 506 may select only motifs associated with QoE degradations, or that appear most frequently in the network, or even the motifs that seem to be leading to a state where QoE degradation is observed in the network. To that end, motif cluster extractor 504 may store information about its identified motifs in a database that motif analyzer 506 can query using a customized query message. It is to be noted that these motifs could also be limited in scope to a certain network path or network router, in some instances.

While the actions of tagging motifs and selecting motifs for analysis may be performed manually (i.e., in response to a request to do so from a user), motif analyzer 506 preferably is configured to perform these actions, automatically. In various embodiments, motif analyzer 506 may do based on one or more policies/parameters, which may be set by default or by a user, such as any or all of the following:
- Number of occurrences of the motifs (potentially on specific types of paths).
- Characteristics of the paths where such motifs have been seen (regions of the world, Service Providers, number of hops, etc.).
- Motifs associated with a poor QoE for a given application.

In a second step, once the selected motifs are retrieved, motif analyzer 506 may perform a meta-clustering on these motifs, whereby the clusters are computed across paths, among any or all the routers in the network for which such telemetry has been generated. These meta clusters represent a common type of network behaviors which are prevalent throughout the network. Furthermore, each meta cluster (across paths) is associated with a measure of QoE. In one embodiment, motif analyzer 506 may use so-called User Experience Score (UES) metrics, obtained from the telemetry. This score may be computed from the application-level metrics, potentially including codec statistics (e.g., jitter buffer, concealment time, etc.), as well.

In one embodiment, motif analyzer 506 may retrieve a set of motifs generated by motif cluster extractor 504, as well as any or all of the following information:
- Source IP Address of the node that detected the motif along one of its paths.
- Path characteristics (when available) such as the number of visited hops, traversed autonomous system (AS), etc. If not available, a specific traceroute command is triggered from the source node to get the set of hops along the path (which may not always be exhaustive due to the policy of the Service Providers hosting the service).

In various embodiments, motif root cause analyzer 508 may be in charge of providing a crucial source of information: the root cause of a given timeseries motif. To that end, motif root cause analyzer 508 first sends a custom message to the routers or other networking devices where the motif(s) of interest (e.g., as identified by motif analyzer 506) have been observed. The goal here is to gather a set of events that took place at the time the motifs were detected. The intent of gathering such telemetry is to get both networking and non-networking metadata to enrich the context of the motif with a root cause that can then be used for troubleshooting and/or machine learning training (e.g., to make routing decisions, predictively).

For example, motif root cause analyzer 508 may request the router/switch logs related to all networking, and non-networking events that took place on the router at the time of detection of the motif of interest. A large set of information can be retrieved, for instance, using the model driven telemetry (MDT) protocol as shown in Table 1 below:

In another embodiment, the motif of interest may be provided by a central engine to the networking equipment (router, switch, etc.), where such a motif has been detected in the past. Next, the router might start a local active monitoring phase for the related KPI (e.g., latency, jitter motif) for a given application using local monitoring or even NetFlow data or even trigger a full capture of the traffic, and gather all metrics of interest, which are co-occurring next time the motif of interest is detected. The custom message may start by requesting a broad set of variables (even sometimes undefined), and successively refine the set of variables that should be collected to a smaller subset. The refinement can be carried out automatically or through human interference where upon analyzing the set of variables associated with the motif, the network SME might determine that several of these variables do not seem to have any correlation with the motif itself. Or, in other words, in this mode of operation, motif root cause analyzer 508 may send a motif of interest according to the criterion specified by motif analyzer 506, requesting a router to capture state variables next time the motif is detected.

In yet another embodiment motif root cause analyzer 508 might broadcast a set of motifs of interest to a plurality of routers/switches, requesting active detection of such motifs and the reporting of device-level metrics from each of the networking devices, such as any or all of the ones shown in Table 1 below:

TABLE 1

| Category | Metrics | Notes |
| --- | --- | --- |
| System | CPU | 5 second granularity |
|  | Memory |  |
|  | Disk |  |
|  | Environmental Data | Temp., Fan Speed, Power |
| Control Plane | Layer 3 BGP/OSPF/ISIS | All BFD Stats |
|  | Layer 2 Protocols (VRRP, HSRP) |  |
|  | NAT Statistics |  |
|  | Tunnel Stats | IP Sec., GRE, etc. |
| Interface Metrics | Pps/bps, errors | 30 second window |
|  | QoS | Classification, Queue Depth, Queue Drops |
|  | ACL and Firewall | Policer Drops |
| Data Path Metrics (QFP) | QFP Load (CPU, memory) | Load of data plane (forwarding resources) |
|  | QFP Statistics | Error counters for various forwarding exceptions |
| Wireless/ Cellular/DSL | Wireless Controller Metrics | Clients connected, signal quality, errors, etc. |
|  | Cellular Metrics | SNR |
|  | DSL Controller Metrics | PPs/bps, errors |

In another embodiment, motif root cause analyzer 508 may also gather (SaaS) application metrics using existing APIs for those SaaS/online applications (e.g. Webex, GoogleMeet, O365 App scores, Zoom Voice/Video Telemetry, etc.). In yet another embodiment, motif root cause analyzer 508 might request a packet capture next time the motif of interest in detected (e.g. Netflow records, raw packet capture). Such information could be investigated using a third-party tool so as to add a tag after the root cause analysis. Moreover, additional information such as configurations may be gathered (not strictly 'telemetry') from the router/switch, or a controller (e.g., SD-WAN controller).

At this point, motif root cause analyzer 508 may provide data for display to a user interface 512 that shows the broad set of (networking and non-networking) variables for the selected set of motifs of interest. For example, consider the two following motifs in FIGS. 8A-8B. In FIG. 8A, the latency/delay motif 800 may be associated with acceptable QoE for Webex, which is likely to be due to congestion in the network. Such a hypothesis as to the root cause for this motif can be confirmed using device-level metrics, such as queue statistics from the networking device(s) at which the motif was observed.

In contrast, the motif 810 in FIG. 8B may be associated with poor QoE for Webex, due to the abrupt increase in the latency/delay (e.g., with a very high first derivative). In such a case, this is likely due to a link failure, which accounts for the timing and shape of this motif. Such a hypothesis can be verified by assessing the routing telemetry from the networking device(s) associated with this motif.

Referring again to FIG. 5, a key operation of motif root cause analyzer 508 is to then correlate such timeseries motifs (of interest) with the on-premise/device-level telemetry, gathered by motif root cause analyzer 508 (e.g., at the time the motif was detected), in order to provide additional meta information for the motif, such as its root cause.

For example, the motif 810 in FIG. 8B is likely to correspond to a link failure. More specifically, motif 810 shows the time to reroute (corresponding to the rerouting time), then an increase of delay that may correspond to the path delay increase due to the reroute along an alternate path followed by the original path restoration. Such a hypothesis could easily be confirmed by motif root cause analyzer 508 using the routing telemetry: the SME would expect to report a loss of routing adjacency (IS-IS, OSPF), or a link failure detection event (BFD, lower layer), followed by a rerouting event (e.g., MPLS TE FRR Link Protection, Fast IGP), and finally the path restoration. The increase in delay (peak height) provides not only an indication of the nature of failure but also the type of restoration that took place in the network, which can be confirmed thanks to the telemetry gathered by motif root cause analyzer 508. For example, a small increase would be likely due to a local reroute around the link/node failure whereas, a higher jump could be due to an end-to-end protection where the second path has a higher delay.

It is important to note that such information is likely to be of interest to a network SME (beyond its use by some machine learning model for predictions) and could be presented for display by motif root cause analyzer 508 via user interface 512. Indeed, the combination of motifs, QoE impact, and networking/non-networking telemetry (helping with root causing) could be used to optimize/modify the network design. One can then determine the network dynamics (recovery strategy), their effect on the network (motif), and their impact on the QoE.

Continuing with the example motifs in FIGS. 8A-8B, in contrast to FIG. 8B, motif 800 in FIG. 8A shows a progressive increase of the delay that is more likely to be caused by a congestion event in the network (e.g., jitter motif would be even more useful here). Such a hypothesis can then be confirmed by motif root cause analyzer 508 by gathering the local QoS variables from the corresponding router (e.g., status of the queues for the traffic experiencing the motif). In such a situation, the network SME may require, via user interface 512, QoS variables from the router which experienced the motif (or a set of routers along the network path as discussed in the next component). The progressive delay may then be explained by progressive queue size increase, etc.

In yet another embodiment, motif root cause analyzer 508 may perform a local computation on the set of telemetry variables co-occurring with the motif of interest. For example, it may compute the correlation coefficients (Kendal, Pearson, Spearman, etc., depending on the specific situation) that could provide additional information to the SME expert for root cause identification. For example, a strong correlation between the system CPU usage, amount of traffic, CPU usage of encryption module and voice QoE on a low-end router may be indicative of a local resource issue impacting the user QoE.

At this point it becomes possible to add one or more tags to the motifs (meta-data) by the network SME via user interface 512, in some embodiments. Several categorical tags could be used (predefined, free-form) such as:

IGP Rerouting due to local link failures;
MPLS TE Rerouting end-to-end;
MPLS TE Rerouting FRR;
Application X server issue;
Local link congestion (queuing delay);
Local queue congestion (packet drop);
etc.

Such tags may be path and/or customer-specific or propagated across paths and networks. For example, when using this proposed invention for a set of paths in the context of SP-managed services, the network SME may trigger the propagation of tags across a set of customers, if it is believed that the signature of the motif (i.e. tag) is customer/network agnostic. For example, a sudden packet drop, lasting for a time interval equal to the Deadtimer of the IGP, (e.g., OSPF RouterDeadTimer=40 s) is highly likely to reliably apply to multiple networks.

Finally, motif correlator 510 may be used to correlate motifs of interest in space and time using the networking topology, in various embodiments. Indeed, motif analyzer 506 allows for the clustering of motifs, whereas motif root cause analyzer 508 may be used to add meta learning, using network-related events. Motif correlator 510 may extend this functionality by also determining whether a given motif is considered local or global.

In general, a local motif is a motif that is only seen at a given location (a router) along a given path at a given time. In contrast, a global motif generally refers to a motif detected on a plurality of routers along a given path or a given part of the network at a given time. Clearly, the two conditions are not exclusive. If a motif M is co-occurring at two locations, it could indicate that the two locations (links) are sharing resources or a given condition. For instance, consider a path, A—link L1—B—link L2—C. If the motif occurs on links L1 and L2 at the same time, this may be due to an issue on router B, or, the links L1 and L2 share resources (Shared Risk Link Group). If a motif M occurs at more than two locations along a given path, the root cause is likely to be the application layer itself (e.g., the application server is congested leading to motif indicating congestion observed along the whole path). The information related to a path may be retrieved by motif correlator 510 using the IGP (e.g., Link State DataBase), BGP Path, or traceroute.

Also, there might be circumstances, where the list of visited hops is not available, in which case paths are partially visible and/or telemetry from the set of visited hops is not available. Such a property may be provided by motif correlator 510 to the network SME via user interface 512 upon retrieving the motif and telemetry of interest, in some instances.

Figure 9:
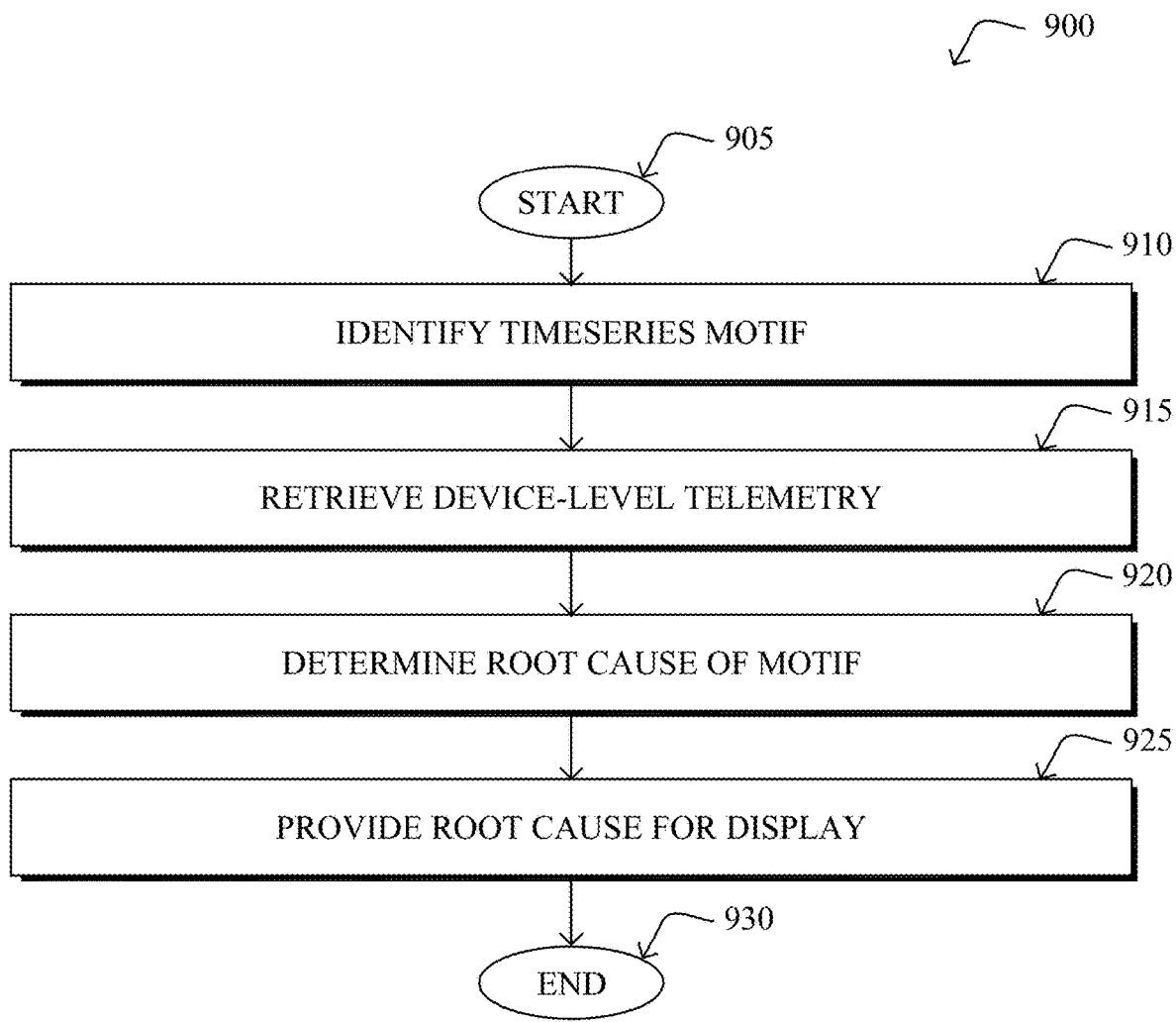
FIG. 9 illustrates an example simplified procedure for root causing impactful timeseries motifs.

FIG. 9 illustrates an example simplified procedure 900 (e.g., a method) for root causing impactful timeseries motifs, in accordance with one or more embodiments described herein. For example, a non-generic, specifically configured device (e.g., device 200), such as controller for a network (e.g., an SDN controller, a cloud-based device, etc.), an edge router, or other device in communication therewith, may perform procedure 900 by executing stored instructions (e.g., application experience optimization process 248). The procedure 900 may start at step 905, and continues to step 910, where, as described in greater detail above, the device may identify a timeseries motif present in a plurality of timeseries of performance metrics for a plurality of paths in a network. In various embodiments, the performance metrics comprise at least one of: packet loss, jitter, delay, or throughput. In various embodiments, the device may identify the timeseries motif by extracting portions of a particular timeseries in the plurality of timeseries and grouping a subset of the portions of the particular timeseries into the timeseries motif based on their similarities. In one embodiment, the device may group the subset by computing distances between portions of the particular timeseries in the subset and one or more other portions outside of the subset.

At step 915, as detailed above, the device may retrieve, based on the timeseries motif, device-level telemetry data from networking devices along the plurality of paths. In some embodiments, the networking devices comprise one or more routers. In one embodiment, the device-level telemetry data is indicative of at least one of: control plane, interface, or data path metrics. In further embodiments, the device-level telemetry data is indicative of at least one of: wireless controller metrics, cellular metrics, or digital subscriber line (DSL) metrics. In yet another embodiment, the device-level telemetry data is indicative of at least one of: system resource metrics (e.g., CPU usage, memory usage, etc.).

At step 920, the device may determine a root cause of the timeseries motif by correlating the timeseries motif with the device-level telemetry data, as described in greater detail above. In some embodiments, the device may do so by receiving, from the user interface, a metadata tag for the root cause. In further embodiments, the device may do so by correlating the timeseries motif with a particular portion of the network.

At step 925, as detailed above, the device may provide an indication of the timeseries motif and its root cause for display by a user interface. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for root causing impactful timeseries motifs in a network, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
    identifying, by a device, a timeseries motif present in a plurality of timeseries of performance metrics for a plurality of paths in a network;
    retrieving, by the device and based on the timeseries motif, device-level telemetry data from networking devices along the plurality of paths;
    determining, by the device, a root cause of the timeseries motif by correlating the timeseries motif with the device-level telemetry data; and
    providing, by the device, an indication of the timeseries motif and its root cause for display by a user interface.

2. The method as in claim 1, wherein the performance metrics comprise at least one of: packet loss, jitter, delay, or throughput.

3. The method as in claim 1, wherein the networking devices comprise one or more routers.

4. The method as in claim 1, wherein determining the root cause comprises:
    receiving, at the device and from the user interface, a metadata tag for the root cause.

5. The method as in claim 1, wherein identifying the timeseries motif comprises:
    extracting portions of a particular timeseries in the plurality of timeseries; and
    grouping a subset of the portions of the particular timeseries into the timeseries motif based on their similarities.

6. The method as in claim 5, wherein grouping the subset of the portions of the particular timeseries into the timeseries motif based on their similarities comprises:
    computing distances between portions of the particular timeseries in the subset and one or more other portions outside of the subset.

7. The method as in claim 1, wherein determining the root cause of the timeseries motif further comprises:
    correlating the timeseries motif with a particular portion of the network.

8. The method as in claim 1, wherein the device-level telemetry data is indicative of at least one of: control plane, interface, or data path metrics.

9. The method as in claim 1, wherein the device-level telemetry data is indicative of at least one of: wireless controller metrics, cellular metrics, or digital subscriber line (DSL) metrics.

10. The method as in claim 1, wherein the device-level telemetry data is indicative of at least one of: system resource metrics.

11. An apparatus, comprising:
one or more network interfaces;
a processor coupled to the one or more network interfaces and configured to execute one or more processes; and
a memory configured to store a process that is executable by the processor, the process when executed configured to:
identify a timeseries motif present in a plurality of timeseries of performance metrics for a plurality of paths in a network;
retrieve, based on the timeseries motif, device-level telemetry data from networking devices along the plurality of paths;
determine a root cause of the timeseries motif by correlating the timeseries motif with the device-level telemetry data; and
provide an indication of the timeseries motif and its root cause for display by a user interface.

12. The apparatus as in claim 11, wherein the performance metrics comprise at least one of: packet loss, jitter, delay, or throughput.

13. The apparatus as in claim 11, wherein the networking devices comprise one or more routers.

14. The apparatus as in claim 11, wherein the apparatus determines the root cause by:
receiving, from the user interface, a metadata tag for the root cause.

15. The apparatus as in claim 11, wherein the apparatus identifies the timeseries motif by:
extracting portions of a particular timeseries in the plurality of timeseries; and
grouping a subset of the portions of the particular timeseries into the timeseries motif based on their similarities.

16. The apparatus as in claim 15, wherein the subset of the portions of the particular timeseries are grouped by the apparatus into the timeseries motif based on their similarities by:
computing distances between portions of the particular timeseries in the subset and one or more other portions outside of the subset.

17. The apparatus as in claim 11, wherein the apparatus determines the root cause by:
correlating the timeseries motif with a particular portion of the network.

18. The apparatus as in claim 11, wherein the device-level telemetry data is indicative of at least one of: control plane, interface, or data path metrics.

19. The apparatus as in claim 11, wherein the device-level telemetry data is indicative of at least one of: wireless controller metrics, cellular metrics, or digital subscriber line (DSL) metrics.

20. A tangible, non-transitory, computer-readable medium storing program instructions that cause a device to execute a process comprising:
identifying, by the device, a timeseries motif present in a plurality of timeseries of performance metrics for a plurality of paths in a network;
retrieving, by the device and based on the timeseries motif, device-level telemetry data from networking devices along the plurality of paths;
determining, by the device, a root cause of the timeseries motif by correlating the timeseries motif with the device-level telemetry data; and
providing, by the device, an indication of the timeseries motif and its root cause for display by a user interface.

* * * * *